Figure 1:
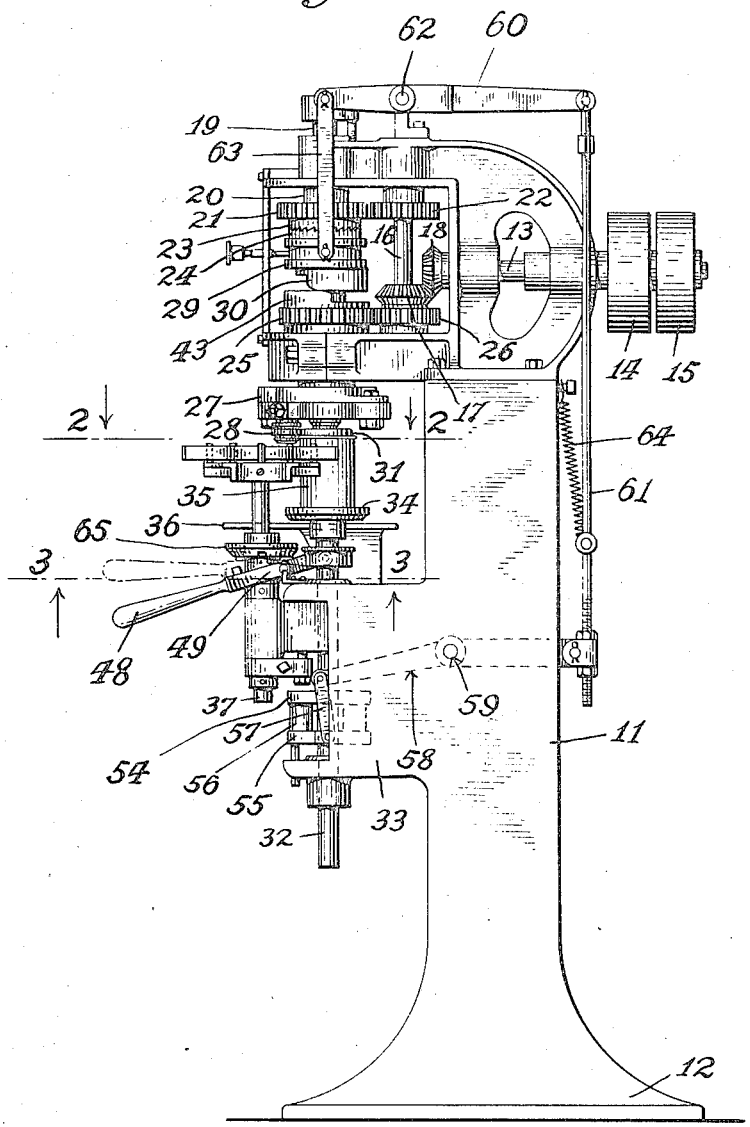

J. BRENZINGER.
CAN HEADING MACHINE.
APPLICATION FILED SEPT. 29, 1913.

1,167,351.

Patented Jan. 4, 1916.
6 SHEETS—SHEET 1.

Attest:

Inventor:
Julius Brenzinger
by _____ Atty

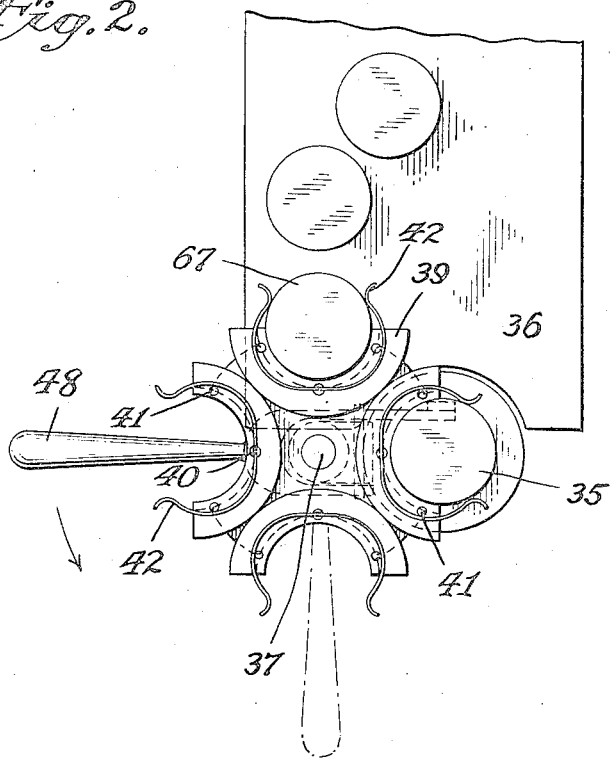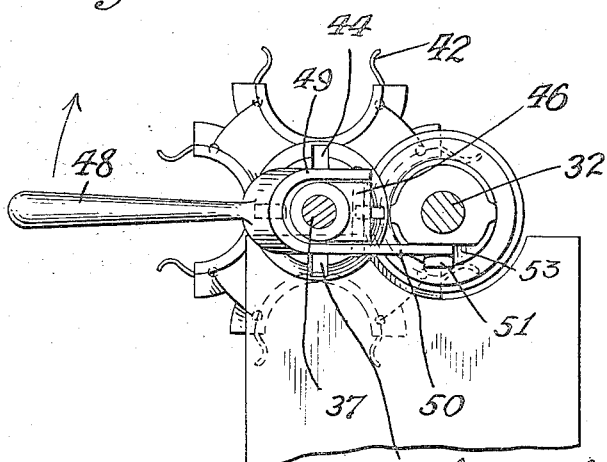

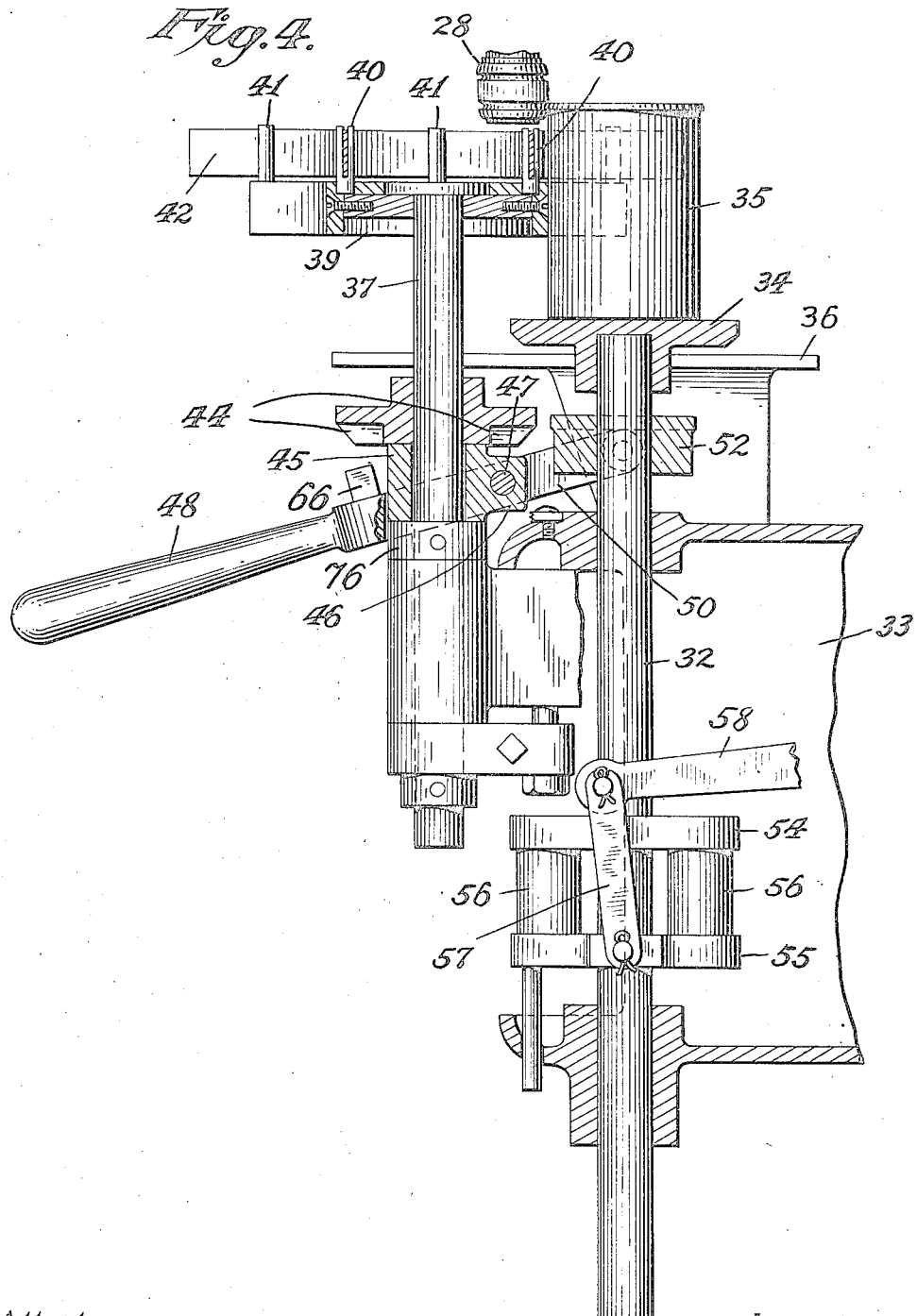

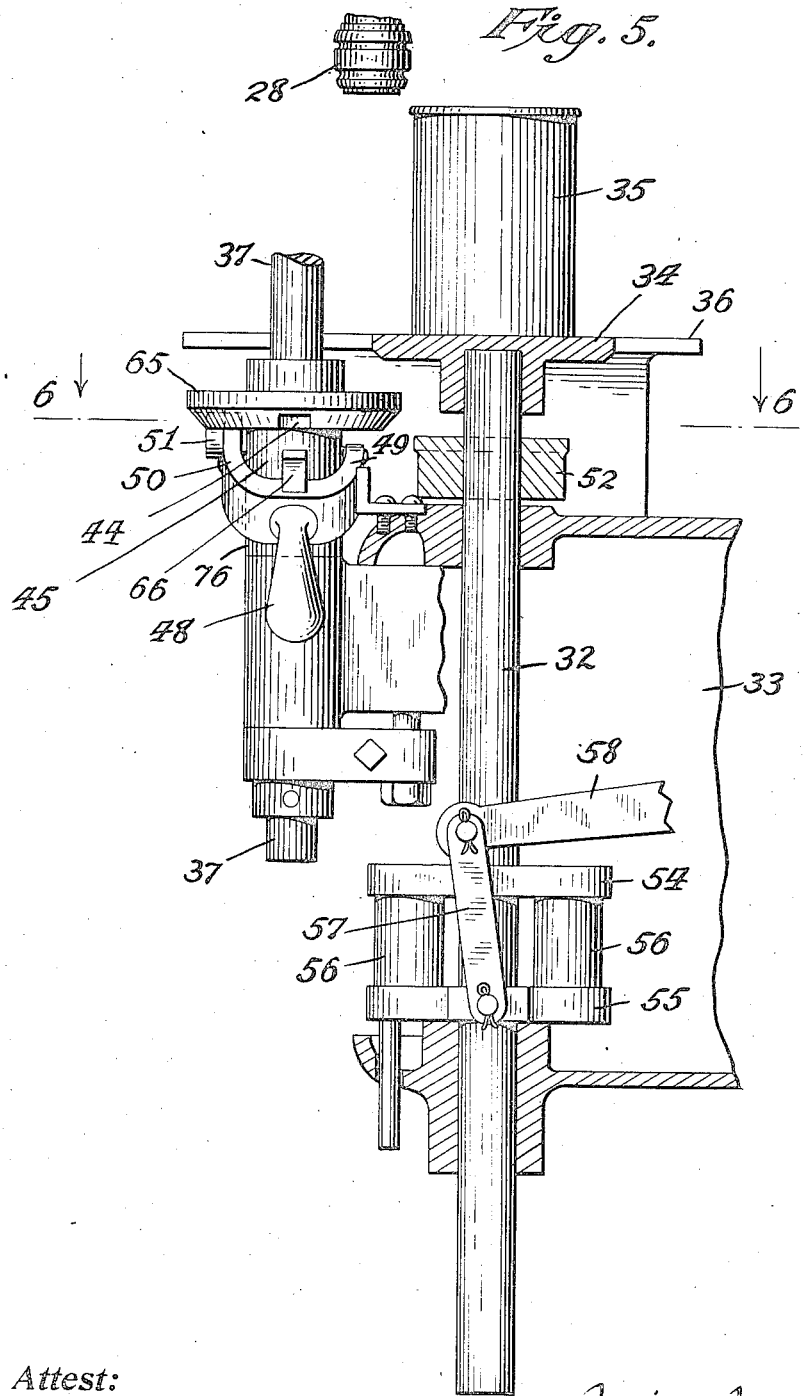

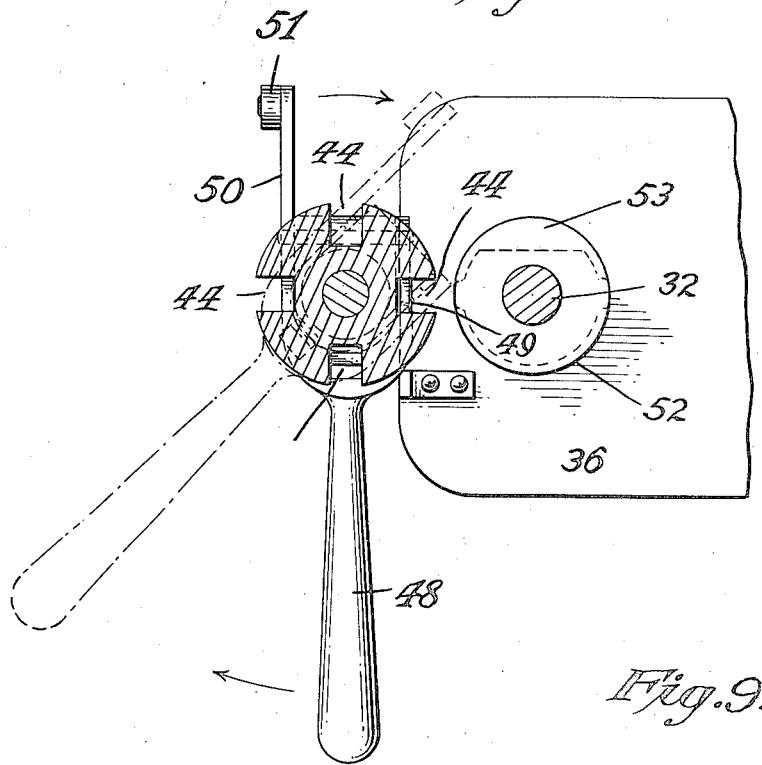
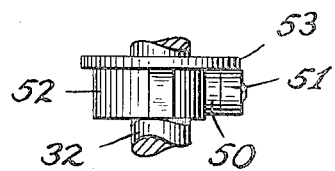

J. BRENZINGER.
CAN HEADING MACHINE.
APPLICATION FILED SEPT. 29, 1913.
1,167,351.
Patented Jan. 4, 1916.
6 SHEETS—SHEET 6.
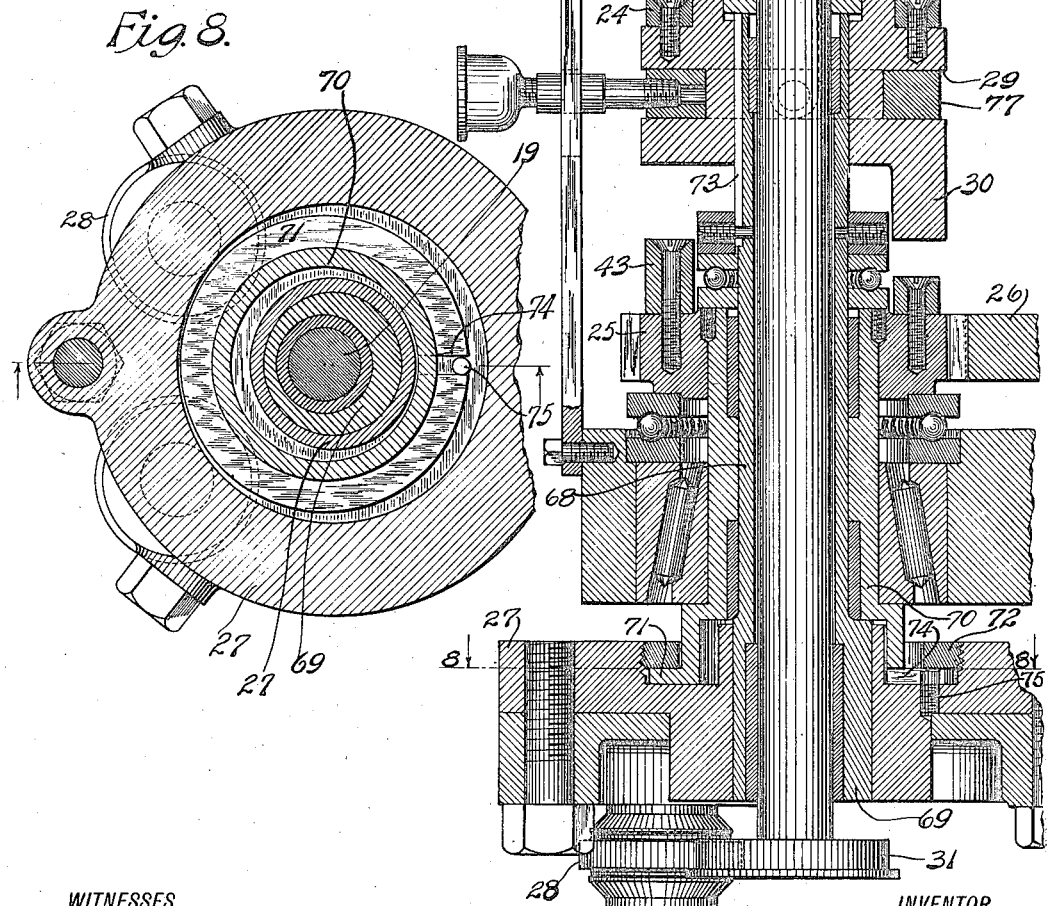
WITNESSES
Fred Pointner
Charles W. Voss.
INVENTOR
Julius Brenzinger
BY
ATTORNEY

UNITED STATES PATENT OFFICE.

JULIUS BRENZINGER, OF MOUNT VERNON, NEW YORK, ASSIGNOR TO THE MAX AMS MACHINE COMPANY, OF MOUNT VERNON, NEW YORK, A CORPORATION OF NEW YORK.

CAN-HEADING MACHINE.

1,167,351.  Specification of Letters Patent.  Patented Jan. 4, 1916.

Application filed September 29, 1913. Serial No. 792,296.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification.

This invention relates to machines for hermetically sealing the tops or covers to the body portions of sheet metal containers, commonly known as tin cans, by what is known as the double seaming process, with more particular reference to mechanism for facilitating the delivery of the assembled can parts in proper adjustment to the seaming mechanism proper and positioning the same therein.

In a co-pending application, filed by me September 29, 1913, Serial No. 792,291, I have shown and described a machine in which the functions above referred to are performed automatically, and the present invention contemplates a simpler form of machine, in which the can parts are fed to the seaming mechanism manually, the invention residing more specifically in a device for facilitating the feeding operations and insuring proper positioning of the assembled and suitably supported can parts in the seaming mechanism.

As suggested above, the principal object of the present invention is that of facilitating the operation and thereby increasing the capacity of a machine in which the assembled can parts are designed to be manually positioned, through the provision of adjuncts which not only insure more nearly perfect adjustment of the assembled parts in the seaming mechanism, but which simplify the usual manual operations and reduce the number thereof. Incidental to the above, I have in view a double seaming machine which is not only simple in construction and operation, durable and dependable, but one which, although requiring manual manipulation of the cans in delivering the same to and ejecting them from the seaming mechanism, may be operated at great speed and be at all times under perfect control of a comparatively unskilled operator in charge.

My invention will be readily understood by reference to the accompanying drawings, forming a part of this specification, in which:

Figure 1 is a side elevation of a can heading machine embodying my invention; Fig. 2 is a horizontal section taken substantially on the line 2—2 of Fig. 1; Fig. 3 is a horizontal section taken substantially on the line 3—3 of Fig. 1; Fig. 4 is a central sectional elevation, on an enlarged scale, of the mechanism for feeding the assembled can parts to the seaming mechanism and adjusting the same therein; Fig. 5 is a view similar to Fig. 4 with the parts in a different position of adjustment, a part of the feeding mechanism being omitted; Fig. 6 is a horizontal section taken substantially on the line 6—6 of Fig. 5; Fig. 7 is an enlarged central sectional elevation of the seaming head and its actuating mechanism; Fig. 8 is a section taken substantially on the line 8—8 of Fig. 7, and Fig. 9 is a side elevation of the collar for raising the platform-supporting shaft, as hereinafter described.

Referring now to the drawings in detail, number 11 designates the main frame of the machine, which is preferably provided with the heavy supporting base 12. In the upper portion of the frame 12 is journaled the main driving shaft 13, provided with the fast and loose pulleys 14 and 15 for connection in the usual manner with any suitable and convenient source of power. In arms which are provided in the upper portion of the frame 11, is journaled the vertical shaft 16, driven from the shaft 13 by means of intermeshed bevel gears 17 and 18. A shaft 19 is also mounted in these arms, this shaft being non-rotatable, but having a limited vertical sliding movement in said arms. Revoluble upon the shaft 19 is a sleeve 20 carrying a gear 21 in mesh with a gear 22 on the shaft 16. The gear 21 is integral with or secured to a toothed collar 23, which provides an upper clutch member with which is adapted to coöperate a correspondingly toothed collar 24 providing a lower clutch member which includes the grooved portion 29 and the cam 30. This collar 24 is mounted on the upper end of a sleeve 68, rotatable on the shaft 19, and is connected with said sleeve by means of a feather 73—or has other suitable connection whereby said sleeve is rotated by rotation of said collar and yet the latter has a limited vertical sliding movement on said sleeve. The sleeve 68 terminates at its lower end in an eccentric head 69, and revoluble upon the concentric upper portion of said sleeve 68 is another sleeve 70, fixed upon the upper end of which is the gear 25 which forms part of a collar which includes the cam 43, said gear 25 being in mesh with the gear 26 on the shaft 16.

The two cams 30 and 43 are normally in what may be termed an interfitting condition, each raised cam surface extending through an arc of approximately 180° and being located, when the collar 24 is in its depressed or lowermost position, within the corresponding depressed surface of the other cam member.

At the lower end of the sleeve 70 is provided a flange 71 which carries the seaming head 27, preferably through the medium of the threaded ring 72 which forms an interior annular groove into which said flange projects. This flange is provided with a radially-disposed slot 74 into which projects a pin 75 on the upper face of the seaming-head 27 whereby the latter is rotated by the former. Furthermore, the peripheral diameter of said flange being less than the diameter of said annular groove, it will be apparent that said seaming-head will have a certain freedom of lateral movement on its support, this movement being limited, first, by rotation of the eccentric head 69, upon which said seaming-head is journaled, and, second, by the pin 75 in the slot 74. This construction is similar to that shown and described in my co-pending application aforesaid, and the manner in which a slight variation in the velocities of the sleeves 68 and 70 will serve to regularly vary the axis of rotation of the seaming head 27, and thereby vary the orbits of revolution of the seaming rollers thereon (only one roller 28 being shown in the drawings) to periodically move said rollers in succession to and from coöperative positional relation to the chuck 31, is shown and described in detail in another co-pending application, filed July 5, 1910, Serial No. 570,343.

For the purpose above briefly set forth, the gears 21 and 25 are so proportioned with relation to the gears 22 and 26, respectively, that the gear 25 is driven at a slightly greater velocity than the gear 21, the ratio of velocities being preferably that of 15 : 14. However, when the collar which includes the cam 30 is in its depressed or lowermost position, with the cams 30 and 43 in what I have termed their interfitting relation, it will be apparent that the sleeve 68 and the sleeve 70 will both be rotated in unison from the gear 26 in mesh with the gear 25. Under such conditions, the eccentric head 69 and the seaming head 27 will obviously rotate in unison and the seaming rollers be revolved in substantially circular orbits which will be at a maximum distance from the chuck 31 when the cams 30 and 43 are so positioned as to come into engagement when the eccentricity of the head 69 is on the same side of the chuck 31 as that upon which the seaming rollers on the head 27 are located. However, when the collar which includes the clutch member 24 and the cam 30 is raised to free the cams 30 and 43 from each other, and at the same time bring the clutch members 23 and 24 into engagement, it will be apparent that while such condition continues the sleeve 70 which carries the seaming-head will be rotated from the gear 22, in mesh with the gear 21, while the eccentric head 69 will continue to be rotated from the gear 26. Therefore, the eccentric head and the seaming-head will be rotated at slightly different velocities, and the seaming rollers will gradually be brought successively into coöperative positional relation to the chuck for the purpose of performing the seaming operation, and be subsequently withdrawn therefrom in a similar manner, as explained.

A vertical rod or shaft 32 is mounted for limited reciprocating movement in suitable slide bearings in the arm 33 of the frame 11, and carries at its upper end a disk 34, which may be termed a platform, and which is adapted to receive the can body 35 and be raised to support the latter against a chuck 31 for the seaming operation. The upper face of this platform 34 is normally in the same horizontal plane as the upper face of the table 36, and with said rod or shaft 32 is positioned under the chuck 31, preferably projecting into a recess in said table, so that can bodies may slide smoothly from table to platform.

Journaled in suitable bearings at the end of the arm 33 of the frame 11 is the shaft 37, carrying at its upper end a circular plate or disk to which is secured a substantially star-shaped casting 39, this member having four semicircular recesses or pockets of suitable size and shape to receive the can bodies. This member 39 is further provided at each recess with a split post 40 which carries a curved strip 42 of spring metal having flaring ends which may be sprung apart by the insertion therebetween of a can body and which embrace said body to retain the same in the recess or pocket by yielding forces which, while sufficient to insure proper lateral positioning of said body under the chuck 31, permit of movement of said body upwardly to said chuck and downwardly therefrom under the action of gravity, and also permit of ready removal of said body after the seaming operation.

Guide posts 41, 41 are provided to retain the ends of the spring strip in proper position.

Loosely mounted on the shaft 37 is a collar 45, supported upon the fixed collar 76 which also serves to support said shaft 37 in its bearings at the end of the arm 33. This loose collar 45 is provided with a lug or projection 46 carrying the pivot 47 upon which are fulcrumed the arms 49 and 50 of a yoked hand lever 48. The shorter arm 49 has no function other than that of providing a stable fulcrum, the arm 50 being longer and carrying at its end a roller 51. It will be seen that this lever is operable horizontally about the shaft 37 as a fulcrum and also vertically upon the pivot 47 as a fulcrum.

Keyed to the shaft 32 is a collar 52, this collar being provided with a flange and being cut away underneath said flange to provide a widened portion 53 upon the side thereof upon which the longer arm 50 of the lever 58 is located, whereby a substantial bearing surface is provided to receive forces of the arm 50 of the lever 48 through the roller 51. It will be apparent, therefore, that when the lever 48 is in such position that the arm 50 thereof with its roller 51 has been brought underneath the widened portion of the flange 53 on the collar 52, and is then depressed, the shaft 32 will be raised to elevate the platform 34.

Fixed upon the shaft 32 is the collar 54, connected with loose collar 55 through the interposition of rubber or other yielding buffers 56, whereby said collar 55 will be raised and lowered with said shaft 32 under yielding forces. A link 57 connects the loose collar 55 with the end of the lever 58, fulcrumed at 59 in the frame of the machine. The other end of the lever 58 is connected with the corresponding end of lever 60 by means of the rod 61, said lever 60 being fulcrumed at 62 and carrying at its other end the connecting rod or link 63, the other end of which may be provided with a suitable roller adapted to travel in a groove of the collar 29, or, as shown in the drawings, and as I consider preferable, the end of the link 63 may be attached to a strap 77 in said groove—either being a well-known form of connection by means of which said collar may be raised and lowered independent of rotation thereof.

From the above description it will be apparent that when a can body 35 is positioned upon the platform 34, with its can top or cover properly adjusted for the seaming operation, the handle of the lever 48 may be depressed to raise the assembled can parts to the point where the top or cover comes into engagement with the chuck 31 which, as is well known, fits within a central depression in said cover and thus serves not only to retain the can top is place but also operates in a well known manner to support the edges of the same against the forces of the seaming operation.

The chuck 31 may be permanently held by the shaft 19 in such relative vertical position that the working peripheral edge thereof is constantly in the same horizontal plane as the working peripheral edges of the seaming rollers. However, on account of the fact that it has been found desirable to yieldingly engage the can top before it becomes rigidly clamped against the flanged body portion of the can, particularly when the container has been of necessity slightly over-filled for the purpose of bringing the contents thereof up to the desired weight, in order to minimize the chances of displacement of the top or cover as the assembled parts are being brought into a rigidly clamped condition, it has been found preferable in most cases to so mount the shaft 19 as to make the same vertically reciprocable through a slight distance, in order that the chuck 31 may be normally located slightly below the plane of the seaming rollers, so that it is first yieldingly engaged by the rising can top and raised therewith and with the shaft 19 to proper vertical position for the seaming operation. After the seamed container has been removed, the chuck may be returned to its normally depressed position under action of gravity, the weight of the shaft 19 being sufficient for this purpose. It will be apparent from Fig. 7 that the shaft 19 may be loosely feathered to the various parts which have connection therewith and thus be vertically reciprocable as explained and for the purpose set forth.

It will be apparent, therefore, that when the handle of the lever 48 is depressed, not only will the shaft 32 be raised to elevate the assembled can parts to proper position in the seaming mechanism, where they are suitably supported against the forces of the seaming operation, but, through operation of the lever 60, the cam members 30 and 43 will be separated and the clutch members 23 and 24 be brought into engagement, thus rendering operations of the seaming mechanism effective through varying the velocities of rotation of the sleeve 68 which carries the eccentric head 69 and the sleeve 70 which carries the seaming-head 27. Now, upon separation of the cam members 30 and 43, which have theretofore been rotating in unison in an interfitting relation, the velocity of rotation of the upper cam member 30 is at once slightly increased. Therefore, the forward end of the raised surface of the upper cam member will be advanced over the rear end of the raised surface of the lower cam member and the former be supported by the latter in its raised position throughout the entire cycle during which the seaming operation is started and completed. The collar which includes the upper cam member 30 being thus held temporarily in its raised position independent of the link 63, it is obvious that the function of said link will be reversed in character, this link now serving, through the lever 60, the connecting rod 61, the lever 58 and the link 57, to retain the shaft 32 with the platform 34 in their raised positions, where said platform continues to sustain the can body, even if the arm 50 of the lever 48 is immediately withdrawn from the collar 52. While under ordinary conditions the forces of gravity would doubtless be sufficient to return the platform 34 to its depressed position and return the cam member 30 to inter-fitting relation to the cam member 43 at the end of each revolution of one cam member relative to the other, I prefer to provide a tension spring 64, interposed between the rod 61 and the frame 11, to augment the forces of gravity for the purposes set forth.

Keyed to the shaft 37 is the disk wheel 65, provided on its under face with preferably four notches or recesses 44 which are equidistantly spaced apart. Each of these notches 44 is of a size and shape to receive the end of a stud 66 on the lever 48. It will be apparent that with these parts in substantially the positions indicated in Fig. 5, the handle of the lever 48 may be raised to cause the stud 66 to enter the recess 44 immediately above the same in the disk 65. The lever 48 may then be moved to the left (Fig. 5) through an arc of 90 degrees, which will obviously have the effect of rotating the shaft 37 with the member 39 thereon through a corresponding arc, and at the same time serve to bring the longer arm 50 of said lever underneath the enlarged portion of the flange 53 on the collar 52, whereupon said lever 48 may be immediately depressed (as shown in Fig. 4) to elevate the can 35 in the manner described. Fig. 2 being a section on the line 2—2 of Fig. 1, is supposed to show the lever 48 in the depressed position, with the can body 35, therefore, in a raised position and being subjected to the first stages of the seaming operation.

Immediately after the can body 35 has been raised and the seaming operation thereon started, with the various parts now in the positions indicated in Fig. 4, the operator grasps another can body 67 on the table 36, with the top or cover superposed thereon, and forces the same between the ends of the spring strips 42, where it is yieldingly retained in the next succeeding recess or pocket in the member 39, as shown in Fig. 2. At the same time, the handle of the lever 48 may be at once raised, the platform 34 remaining in its elevated position and the can 35 remaining in a properly supported condition, as explained, and said handle then moved in the direction of the arrow (Fig. 2) through an arc of 90 degrees, which brings the lug 66 on said lever underneath the notch in the disk wheel 65 on the side thereof opposite to the side upon which the can 67 is located, whereupon the handle of said lever may be raised to again engage said disk wheel in the manner described. During these operations, the seaming operation on the can 35 will have been completed, and said can been returned with the platform 34 to their original depressed positions, the spring arms 42 still yieldingly retaining the can 35 therebetween. Therefore, as the handle of the lever 48 is again moved to the left from the position indicated in Fig. 6, the can body 67 will be advanced toward the platform 34 as the now seamed can 35 is being by the same means withdrawn therefrom. At the end of this horizontal stroke of the lever through an arc of 90 degrees, it will be apparent that a seamed can has been withdrawn from the platform and that there has been positioned thereon the assembled parts of the next succeeding can to be headed.

With respect to the present invention, it will be noted that while the gears 22 and 26 on the shaft 16 are constantly rotated during operation of the machine, and, therefore, the gears 21 and 25 are being constantly rotated, the latter rotating the seaming head 27, nevertheless the seaming rollers are held out of coöperative relation to the chuck 31 in the absence of the operation of raising the assembled parts of a can to be headed and thereby operating the clutch mechanism, as described. The seaming tools, therefore, will be brought into work-engaging positions when, and only when, the means for positioning a can body in the seaming mechanism is operated, and will be automatically withdrawn from such positions immediately upon completion of the seaming operation. Furthermore, it will be noted that once the platform 34 is elevated, with a can body 31 thereon, and the clutch mechanism is rendered operative, the means which have served to raise said platform may be withdrawn therefrom, and still the can body will be properly supported throughout the seaming operation.

Of course the machine just described, being hand-operated so far as the feeding mechanism is concerned, will obviously not have the capacity of machines to which the assembled can parts are delivered and the seamed can ejected automatically, such as shown and described in my co-pending application aforesaid. However, automatic feeding and ejecting devices are more complicated and expensive, and the principal purpose of this invention is the provision of an improved hand-fed machine, the capacity of which is only limited by the skill of a single operator, and which is so simple in construction as to be in cost within the reach of smaller packers and other users of these machines, the volume of whose business would not justify the expense of more complicated and expensive machinery.

Many modifications of my improved can heading machine will doubtless readily suggest themselves to those skilled in the art to which it appertains, and I therefore do not desire to limit my invention to the specific construction herein shown and described.

I claim as new and desire to secure Letters Patent:

1. In a can heading machine, the combination, with a seaming tool and its actuating means, and means for engaging the assembled can parts and sustaining the same against the forces of the seaming operation, of means for conveying an assembled can body and head to and positioning the same in said engaging means, and a single member manually operable to first actuate said conveying means and then said engaging means.

2. In a can heading machine, the combination, with a seaming tool and its actuating means, and means for engaging the assembled can parts and sustaining the same against the forces of the seaming operation, of means for conveying an assembled can body and head to and positioning the same in said engaging means, means manually operable to first actuate said conveying means and then said engaging means, and means for holding said engaging means in engaging and sustaining condition after withdrawal of said actuating means and throughout the seaming operation.

3. In a can heading machine, the combination, with a seaming tool, means for engaging the assembled can parts and sustaining the same against the forces of the seaming operation, means comprising disconnected elements connectible to advance and retract said tool to and from work-engaging position during continuous operation thereof, and means for effecting such connection, of means for conveying an assembled can body and head to and positioning the same in said engaging means, and a single member manually operable to severally actuate said conveying means, said engaging means and said means for connecting the elements of said advancing and retracting means.

4. In a can heading machine, the combination, with a seaming tool, means for engaging the assembled can parts and sustaining the same against the forces of the seaming operation, means comprising disconnected elements connectible to advance and retract said tool to and from work-engaging position during continuous operation thereof, and means for effecting such connection, of means for conveying an assembled can body and head to and positioning the same in said engaging means, and means manually operable at one stroke to first actuate said conveying means and upon continuation of said stroke to actuate said engaging means and said means for connecting the elements of said advancing and retracting means.

5. In a can heading machine, the combination, with a seaming tool, means for engaging the assembled can parts and sustaining the same against the forces of the seaming operation, means comprising disconnected elements connectible to advance and retract said tool to and from work-engaging position during continuous operation thereof, and means for effecting such connection, continuing the same throughout the seaming operation and then restoring said condition of disconnection, of means for conveying an assembled can body and head to and positioning the same in said engaging means, and a single member manually operable to severally actuate said conveying means, said engaging means and said means for connecting the elements of said advancing and retracting means.

6. In a can heading machine, the combination, with a seaming tool, means for engaging the assembled can parts and sustaining the same against the forces of the seaming operation, means comprising disconnected elements connectible to advance and retract said tool to and from work-engaging position during continuous operation thereof, and means for effecting such connection, continuing the same throughout the seaming operation and then restoring said condition of disconnection, of means for conveying an assembled can body and head to and positioning the same in said engaging means, and means manually operable at one stroke to first actuate said conveying means and upon continuation of said stroke to actuate said engaging means and said means for connecting the elements of said advancing and retracting means.

7. In a can heading machine, the combination, with a seaming tool, means for engaging the assembled can parts and sustaining the same against the forces of the seaming operation, means comprising disconnected elements connectible to advance and retract said tool to and from work-engaging position during continuous operation thereof, and means for effecting such connection, continuing the same throughout the seaming operation and then restoring said condition of disconnection, of means for conveying an assembled can body and head to and positioning the same in said engaging means, and a single member manually operable to severally actuate said conveying means, said engaging means and said means for connecting the elements of said advancing and retracting means, said connecting means and said engaging means including elements which coöperate to retain said engaging means in an engaging condition after withdrawal of said actuating means and throughout the seaming operation.

8. In a can heading machine, the combination, with a seaming tool, means for engaging the assembled can parts and sustaining the same against the forces of the seaming operation, means comprising disconnected elements connectible to advance and retract said tool to and from work-engaging position during continuous operation thereof, and means for effecting such connection, continuing the same throughout the seaming operation and then restoring said condition of disconnection, of means for conveying an assembled can body and head to and positioning the same in said engaging means, and means manually operable at one stroke to first actuate said conveying means and upon continuation of said stroke to actuate said engaging means and said means for connecting the elements of said advancing and retracting means, said connecting means including an element coöperating with an element in said engaging means to hold the latter in an engaging condition after withdrawal of said actuating means and throughout the seaming operation.

9. In a can heading machine, the combination, with the seaming mechanism, a vertically reciprocable support for the assembled parts of the can to be headed, and means coöperating with said support to engage said parts and sustain the same against the forces of the seaming operation, of manually operated means for raising said support, and means for retaining the same in its raised position after withdrawal of said raising means and throughout the seaming operation.

10. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and positioning the same thereon, of means manually operable at one stroke to first actuate said conveying means and upon continuation of said stroke to raise said support.

11. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and positioning the same thereon, of manually operated means for actuating said conveying means and raising said support, and means for retaining said support in its raised position after withdrawal of said raising means and throughout the seaming operation.

12. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and positioning the same thereon, of means manually operable at one stroke to first actuate said conveying means and upon continuation of said stroke to raise said support, and means for retaining said support in its raised position after withdrawal of said raising means and throughout the seaming operation.

13. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and positioning the same thereon, of a lever manually operable in one direction to actuate said conveying means and in a substantially transverse direction to raise said support.

14. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and positioning the same thereon, of a lever manually operable in one direction to actuate said conveying means and in a substantially transverse direction to raise said support, and means for retaining said support in its raised position after withdrawal of said lever and throughout the seaming operation.

15. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and simultaneously withdrawing a headed can therefrom, of means manually operable at one stroke to first actuate said conveying means and upon continuation of said stroke to raise said support.

16. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and simultaneously withdrawing a headed can therefrom, of manually operated means for actuating said conveying means and raising said support, and means for retaining said support in its raised position after withdrawal of said raising means and throughout the seaming operation.

17. In a can heading machine, the combination, with the seaming mechanism, a vertically reciprocable support for the assembled parts of the can to be headed, means coöperating with said support when raised to engage said parts and sustain the same against the forces of the seaming operation, and means for conveying an assembled can body and head to said support and simultaneously withdrawing a headed can therefrom, of means manually operable at one stroke to first actuate said conveying means and upon continuation of said stroke to raise said support, and means for retaining said support in its raised position after withdrawal of said raising means and throughout the seaming operation.

18. In a can heading machine, the combination, with a seaming tool, a vertically reciprocating support for the assembled parts of a can to be headed, means coöperating with said support when raised to engage said parts and sustain the same against the forces of the seaming operation, means comprising disconnected elements connectible to advance and retract said tool to and from work-engaging position during continuous operation thereof, means for effecting such connection, and means for conveying an assembled can body and head to and positioning the same in said engaging means, of a lever manually operable in a substantially horizontal direction to actuate said conveying means and in a substantially vertical direction to raise said support and actuate said means for connecting the elements of said advancing and retracting means.

19. In a can heading machine, the combination, with a seaming tool, a vertically reciprocating support for the assembled parts of a can to be headed, means coöperating with said support when raised to engage said parts and sustain the same against the forces of the seaming operation, means comprising disconnected elements connectible to advance and retract said tool to and from work-engaging position during continuous operation thereof, means for effecting such connection, continuing the same throughout the seaming operation and then restoring said condition of disconnection, and means for conveying an assembled can body and head to and positioning the same in said engaging means, of a lever manually operable in a substantially horizontal direction to actuate said conveying means and in a substantially vertical direction to raise said support and actuate said means for connecting the elements of said advancing and retracting means.

20. In a can heading machine, the combination, with a seaming tool, a vertically reciprocable support for the assembled parts of a can to be headed, means coöperating with said support when raised to engage said parts and sustain the same against the forces of the seaming operation, means comprising disconnected elements connectible to advance and retract said tool to and from work-engaging position during continuous operation thereof, means operable to effect such connection, and means for conveying an assembled can body and head to and positioning the same in said engaging means, of a lever manually operable in a substantially horizontal direction to actuate said conveying means and in a substantially vertical direction to raise said support and actuate said means for connecting the elements of said advancing and retracting means, said connecting means and said advancing and retracting means including elements coöperating to retain said support in its raised position and said connecting means in connected condition after withdrawal of said lever and throughout the seaming operation.

21. In a can heading machine, the combination, with the seaming mechanism, of a vertically reciprocable shaft carrying a support for the assembled parts of a can to be headed, a hand lever operable to raise said shaft and therewith said support and the can parts thereon to position the latter in said seaming mechanism, and means for temporarily retaining said shaft in its raised position after withdrawal of said lever.

22. In a can heading machine, the combination, with the seaming mechanism, of a vertically reciprocable shaft carrying a support for the assembled parts of a can to be headed, a conveyer for delivering said can parts to said support, and a hand lever operable in one direction to actuate said conveyer and in another direction to raise said shaft and therewith said support and the can parts thereon to position the latter in said seaming mechanism.

23. In a can heading machine, the combination, with the seaming mechanism, of a vertically reciprocable shaft carrying a support for the assembled parts of a can to be headed, a conveyer for delivering said can parts to said support, a hand lever operable in one direction to actuate said conveyer and in another direction to raise said shaft and therewith said support and the can parts thereon to position the latter in said seaming mechanism, and means for temporarily retaining said shaft in its raised position after withdrawal of said lever.

24. In a can heading machine, the combination, with the seaming mechanism, of a vertically reciprocable shaft carrying a support for the assembled parts of a can to be headed, a conveyer for delivering said can parts to said support, retaining the same in position thereon and removing the seamed can therefrom, and a hand lever operable in one direction to actuate said conveyer and in another direction to raise said shaft and therewith said support and the can parts thereon to position the latter in said seaming mechanism.

25. In a can heading machine, the combination, with the seaming mechanism, of a vertically reciprocable shaft carrying a support for the assembled parts of a can to be headed, a conveyer for delivering said can parts to said support, retaining the same in position thereon and removing the seamed can therefrom, a hand lever operable in one direction to actuate said conveyer and in another direction to raise said shaft and therewith said support and the can parts thereon to position the latter in said seaming mechanism, and means for temporarily retaining said shaft in its raised position after withdrawal of said lever.

26. In a can heading machine, the combination, with the seaming mechanism, of a vertically reciprocable shaft carrying a support for the assembled parts of a can to be headed, a rotatable shaft having a conveyer mounted thereon and positioned to deliver the assembled can parts to said support, and a hand lever operable in one direction to rotate said conveyer shaft and in another direction to raise said first-mentioned shaft.

27. In a can heading machine, the combination, with the seaming mechanism, of a vertically reciprocable shaft carrying a support for the assembled parts of a can to be headed, a rotatable shaft having a conveyer mounted thereon and positioned to deliver the assembled can parts to said support, a hand lever operable in one direction to rotate said conveyer shaft and in another direction to raise said first-mentioned shaft, and means for temporarily retaining said shaft in its raised position after withdrawal of said lever.

28. In a can heading machine, the combination, with the seaming mechanism, of a vertically reciprocable shaft carrying a support for the assembled parts of a can to be headed, a rotatable shaft having a conveyer mounted thereon and positioned to deliver the assembled can parts to said support, retain the same thereon and remove the headed can therefrom, and a hand lever operable in one direction to rotate said conveyer shaft and in another direction to raise said first-mentioned shaft.

29. In a can heading machine, the combination, with the seaming mechanism, of a vertically reciprocable shaft carrying a support for the assembled parts of a can to be headed, a rotatable shaft having a conveyer mounted thereon and positioned to deliver the assembled can parts to said support, retain the same thereon and remove the headed can therefrom, a hand lever operable in one direction to rotate said conveyer shaft and in another direction to raise said first-mentioned shaft, and means for temporarily retaining said shaft in its raised position after withdrawal of said lever.

30. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a conveyer for feeding an assembled can body and head to said support, a hand lever operable in one direction to actuate said conveyer and in another direction to raise said shaft and therewith said support and the can parts thereon to position the latter for the seaming operation, connecting means between said shaft and one of said disconnected elements to effect connection of said elements when said shaft is raised, and means for retaining such connection after withdrawal of said lever until completion of the seaming operation.

31. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a conveyer for feeding an assembled can body and head to said support, a hand lever operable in one direction to actuate said conveyer and in another direction to raise said shaft and therewith said support and the can parts thereon to position the latter for the seaming operation, connecting means between said shaft and one of said disconnected elements to effect connection of said elements when said shaft is raised, and means for retaining such connection after withdrawal of said lever until completion of the seaming operation and thereby retain said shaft in its raised position throughout the same interval.

32. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a conveyer for feeding an assembled can body and head to said support, yieldingly retaining the same in position thereon and withdrawing a headed can therefrom, a hand lever operable in one direction to actuate said conveyer and in another direction to raise said shaft and therewith said support and the can parts thereon to position the latter for the seaming operation, connecting means between said shaft and one of said disconnected elements to effect connection of said elements when said shaft is raised, and means for retaining such connection after withdrawal of said lever until completion of the seaming operation.

33. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a conveyer for feeding an assembled can body and head to said support, yieldingly retaining the same in position thereon and withdrawing a headed can therefrom, a hand lever operable in one direction to actuate said conveyer and in another direction to raise said shaft and therewith said support and the can parts thereon to position the latter for the seaming operation, connecting means between said shaft and one of said disconnected elements to effect connection of said elements when said shaft is raised, and means for retaining such connection after withdrawal of said lever until completion of the seaming operation and thereby retain said shaft in its raised position throughout the same interval.

34. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a rotatable shaft having a conveyer mounted thereon so positioned as to feed an assembled can body and head to said support, a hand lever operable in one direction to rotate said conveyer shaft and in another direction to raise said first-mentioned shaft and therewith said support and the can parts thereon to position the latter for the seaming operation, connecting means between said reciprocable shaft and one of said disconnected elements to effect connection of said elements when said shaft is raised, and means for retaining such connection after withdrawal of said lever until completion of the seaming operation.

35. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a rotatable shaft having a conveyer mounted thereon so positioned as to feed an assembled can body and head to said support, a hand lever operable in one direction to rotate said conveyer shaft and in another direction to raise said first-mentioned shaft and therewith said support and the can parts thereon to position the latter for the seaming operation, connecting means between said reciprocable shaft and one of said disconnected elements to effect connection of said elements when said shaft is raised, and means for retaining such connection after withdrawal of said lever until completion of the seaming operation, and thereby retain said reciprocable shaft in its raised position throughout the same interval.

36. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a rotatable shaft having a conveyer mounted thereon so positioned as to feed an assembled can body and head to said support, yieldingly retain the same in position thereon and withdraw a headed can therefrom, a hand lever operable in one direction to raise said first-mentioned shaft and therewith said support and the can parts thereon to position the latter for the seaming operation, connecting means between said reciprocable shaft and one of said disconnected elements to effect connection of said elements when said shaft is raised, and means for retaining such connection after withdrawal of said lever until completion of the seaming operation.

37. In a can heading machine, the combination, with a seaming tool and means comprising disconnected elements connectible to advance and retract said tool to and from work-engaging position during continuous operation thereof, of a vertically reciprocable shaft carrying a support for the assembled parts of a can to be headed, a rotatable shaft having a conveyer mounted thereon so positioned as to feed an assembled can body and head to said support, yieldingly retaining the same in position thereon and withdrawing a headed can therefrom, a hand lever operable in one direction to rotate said conveyer shaft and in another direction to raise said first-mentioned shaft and therewith said support and the can parts thereon to position the latter for the seaming operation, connecting means between said reciprocable shaft and one of said disconnected elements to effect connection of said elements when said shaft is raised, and means for retaining such connection after withdrawal of said lever until completion of the seaming operation and thereby retain said reciprocable shaft in its raised position throughout the same interval.

In testimony of the foregoing, I have hereunto set my hand in the presence of two witnesses.

JULIUS BRENZINGER.

Witnesses:
JOHN E. PINCKNEY,
L. R. WATKYNS.